United States Patent Office 3,106,225
Patented Oct. 8, 1963

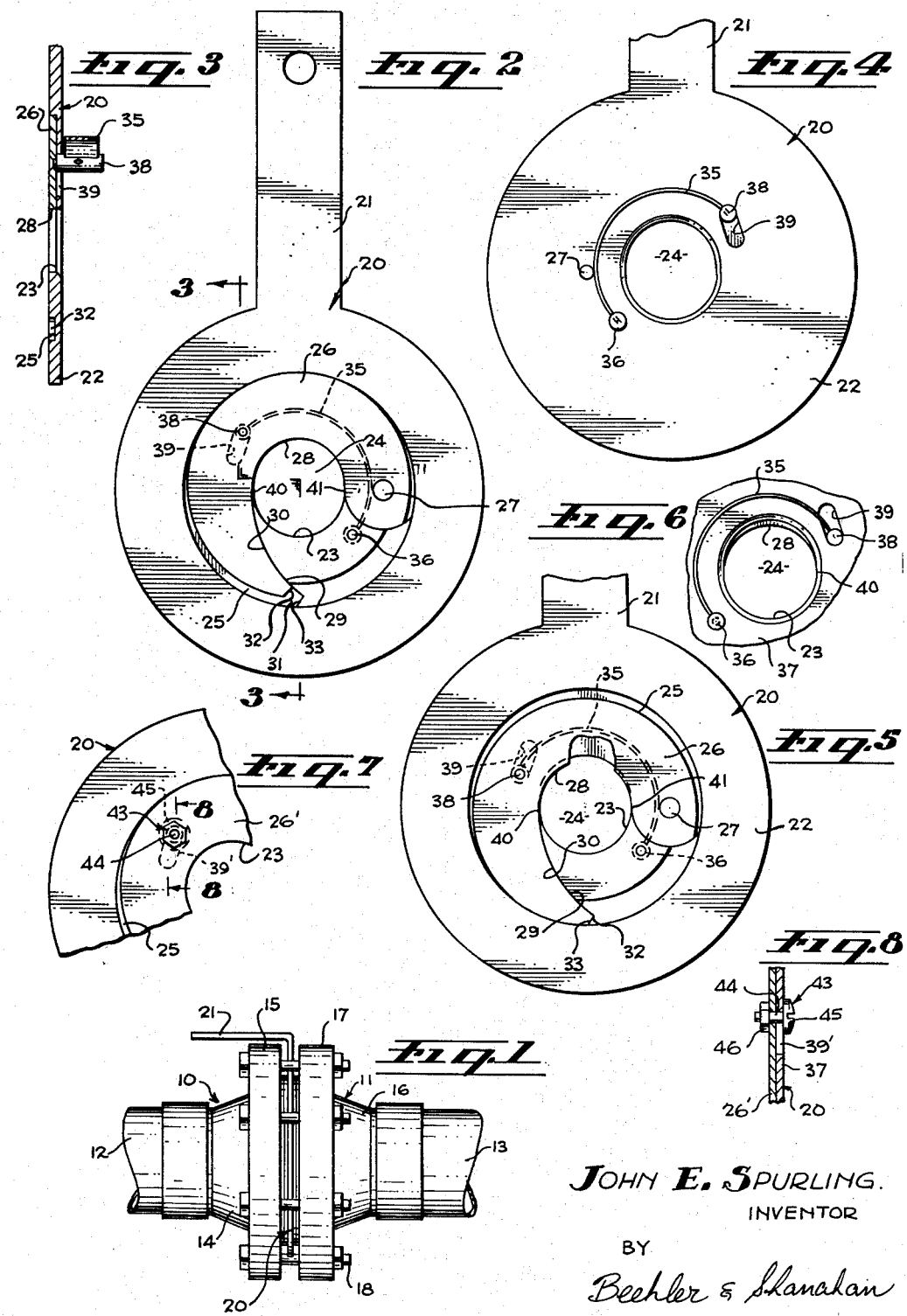

3,106,225
VARIABLE ORIFICE
John E. Spurling, Encino, Calif., assignor to International Electronic Research Corp., Burbank, Calif., a corporation
Filed Feb. 15, 1960, Ser. No. 8,636
5 Claims. (Cl. 138—45)

The invention relates to fluid control and metering devices and has special reference to a simple orifice plate of variable character which can be applied to a fluid line and there to provide an automatically variable orifice opening subject to conditions of the fluid in the line.

In the hydraulic art as that term is broadly employed, it is a common expedient to make use of a thin plate orifice when placing a flow restriction in the line for sundry purposes such as measuring fluid flow or pressure by a differential pressure on opposite sides of the orifice and to measure fluid pressure in the line. Heretofore in order to accommodate many and various types of fluids simple installations have made use of flanged and recessed pipe fittings with a thin-plate orifice of fixed size placed between them. When different conditions are to be accommodated, the practice has been to uncouple the fittings and replace the fixed orifice with one of a different size. This, of course, is a time-consuming operation and necessitates having available a set of numerous plates each providing an orifice of different size. Moreover, because of variations in temperature in the line, this practice has limitations in that when the density varies as a result of temperature changes, the differential pressure across the orifice remains constant and is no longer a dependable indication of mass flow conditions in the line.

It is therefore among the objects of the invention to provide a new and improved simple thin plate orifice of such a character that the size of the orifice can be varied by infinite increments without the necessity of replacing the orifice plate.

Another object of the invention is to provide a new and improved simple thin plate orifice assembly which permits making semi-permanent changes in the orifice of any desired amounts throughout the range of adjustment by use of a single adjusting expedient.

Still another object of the invention is to provide a new and improved automatically variable plate orifice which is subject to variation in response to temperature variations in the line and particularly in the fluid passing the orifice.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 1 is a side elevational view of a fitting assembly in a fluid line wherein use is made of a variable orifice.

FIGURE 2 is a plan view of a variable orifice plate assembly.

FIGURE 3 is a longitudinal sectional view taken on the line 3—3 of FIGURE 2.

FIGURE 4 is a plan view of operating parts of the orifice plate assembly on the side opposite FIGURE 2.

FIGURE 5 is a plan view similar to FIGURE 2 showing the parts in a different position of adjustment.

FIGURE 6 is a fragmentary plan view similar to FIGURE 4 with parts in the position of adjustment corresponding to FIGURE 5.

FIGURE 7 is a fragmentary plan view of a modified form of the device.

FIGURE 8 is a fragmentary sectional view taken on the line 8—8 of FIGURE 7.

In a form of the invention chosen for the purpose of illustration there is shown an upstream side fitting 10, a downstream side fitting 11, an inlet pipe 12 and an outlet pipe 13 forming a fitting assembly in a fluid line which may accommodate the flow of virtually any liquid or gaseous fluid. The fitting 10 has a central portion 14 which may provide a suitable internal recess (not shown) and a flange 15. Similarly the fitting 11 has a central portion 16 for an internal recess (not shown) and a flange 17 attached to the flange 15 by means of bolts 18.

The orifice plate assembly shown in FIGURES 2, 4 and 5 includes a plate member 20, frequently identified as a paddle having thereon a handle or extension 21. The plate member is relatively thin and of gage comparable to that of fixed paddle orifice plates heretofore prevalent in the trade. The diameter of the plate member is such that when assembled with the fittings 10 and 11 it will be inside the bolts 18 and will also be large enough to entirely close the space between the fittings.

Preferably, in order to minimize turbulence and smooth out the flow of fluid to the greatest possible degree, the upstream face 22 of the plate member 20 should have substantially unbroken continuity over the portion exposed within the fitting and the rim 23 of the orifice opening 24 should also be circumferentially continuous. This is accomplished in part by providing a recess 25 in the upstream face for reception of a movable orifice element 26 pivotally mounted therein by use of a rivet 27. The recess 25 is in the shape of a crescent having a width substantially equal to the width of the movable orifice element 26 and a length slightly greater to permit the desired amount of movement.

To accomplish the desired result, namely, providing circumferential continuity for the rim 23 in a substantially circular pattern, the inner edge of the movable element has one semicircular edge section 28 substantially concentric relative to the center of the orifice opening 24 and another semicircular edge section 29 concentric relative to the center of the rivet 27. For about one-half the circumference the orifice opening 24 corresponds to the edge section 28 but is elongated slightly by an amount equal to the range of the orifice adjustment as shown by the difference in area between the orifice opening of FIGURE 2 and that of FIGURE 5. An arcuate edge 30 of the recess 25 is also concentric with respect to the rivet 27 so as to precisely fit the edge section 29. A small space 31 remains between an end edge section 32 of the movable orifice element and an end edge 33 of the recess 25 which is closed in the fully contracted position of FIGURE 5.

As will be apparent from the foregoing description of the relationship of the parts, the orifice opening 24 is in maximum open position as shown in FIGURE 2 when the movable orifice element 26 is rotated clockwise to the greatest degree possible. Contrarily the orifice opening is at minimum contracted position of adjustment as shown in FIGURE 5 when the movable orifice element 26 is rotated counterclockwise to the greatest degree possible. Obviously the variations between maximum open position and minimum contracted position are infinite.

To provide for automatic variation in settings of the orifice opening 24 in response to changes in temperature, use is made of an actuator in the form of a bimetallic strip 35 shown in FIGURES 4 and 6. The strip employs metal elements of different kinds and of selected high degree of performance bound together to flex in the usual manner of bimetallic strips. One end of the strip is fixed in a stud 36 anchored to the downstream face 37 of the plate member 20. The other or free end of the strip is fixed to a plug 38 which in turn extends through a slot 39 in the plate member 20 and is securely attached to the movable orifice element 26 at substantially its midportion. Since the bimetallic strip 35 is on the downstream face 37 of the orifice plate member it does not impair the effect of the flush area on the upstream face. It is however, immediately responsive to temperature changes in fluid passing through the orifice so that when the temperature decreases, the curvature of the strip will diminish and cause the stud 38 to pass from one end of the slot 39, as shown in FIGURE 2, toward the other end by an amount in proportion to the amount of change in temperature. Conversely, when the temperature increases, the curvature of the strip 35 expands and the stud moves from positions in the end of the slot comparable to FIGURE 5 toward the opposite end by amounts in proportion to temperature changes. The movement is, of course, subject to reversal at any time there is a comparable reversal of temperature condition.

It is important to note that as the movable orifice element shifts throughout all positions of adjustment, appropriate portions of the edge sections 28, 29 are always tangent to a point 40 where they intersect the circumference of the rim 23 of the orifice opening and that there is always substantial tangency also at the point 41 on the opposite side, thereby to assure the unbroken circumferential continuity in all positions of adjustment.

When use is made of the temperature responsive orifice assembly above described it can be placed in the line as a substantially permanent assembly sealed between the fittings 10 and 11 and will perform continuously. On those occasions where temperature variation is not a factor, an orifice which can be set at any time to a selected size may be preferable. For this the same plate member 20 may be used with a slightly modified movable orifice element 26'. The difference lies primarily in providing a releasable fastening 43 shown in FIGURES 7 and 8 and omitting entirely the bimetal strip 35 and its mountings. For convenience the same slot 39' may be used as heretofore described. A screw 44 extends through the slot 39' and through the movable orifice element 26. A head 45 overlies the plate member 20 on the downstream face 37. A nut 46 overlying the movable orifice element 26' on the upstream side is made use of in fastening the element 26' stationarily relative to the plate member 20 at a selected orifice opening adjustment. Hence, when a change is to be made it is necessary only to release the fittings 10 and 11, remove the orifice plate assembly only long enough to loosen the fastening 43, make a new setting of the movable orifice element 26, tighten the fastening and then return the orifice plate assembly to its position between the fittings.

The simple but highly effective and dependable structural relationship of parts herein disclosed as constituting the invention makes available a practical orifice device which alternately may be of a fixed variable type or a temperature responsive automatically variable device without substantial change needing to be made in the parts.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. An orifice fitting comprising an upstream casing, a downstream casing, faces respectively on said casings having recesses therein forming when assembled an orifice chamber, an orifice plate comprising a stationary orifice element having opposite parallel surfaces adapted to be secured between the faces of said casings and securing means extending from one casing to the other past said orifice plate to hold said casings and plate in assembled position, said orifice plate having a hole therethrough and a recess in one of said surfaces extending circumferentially of and being open to said hole, a movable orifice element pivotally mounted in said plate recess, an arcuate edge on said movable orifice element being tangent in all positions of adjustment to the perimeter of the hole, and an actuator for the movable orifice element responsive to temperature changes in the chamber comprising an arcuate bimetallic strip extending around the exterior of said hole, means anchoring one end of said strip in the fitting and means securing the other end of said strip to said movable orifice element whereby to change the size of the hole in response to changes in temperature in the strip.

2. An orifice fitting comprising an upstream casing, a downstream casing, faces respectively on said casings having recesses therein forming when assembled an orifice chamber, an orifice plate comprising a stationary orifice element having opposite parallel surfaces adapted to be secured between the faces of said casings and securing means extending from one casing to the other past said orifice plate to hold said casings and plate in assembled position, said orifice plate having a hole therethrough, a movable orifice element pivotally mounted on said plate, an edge on said movable orifice element joining the perimeter of said hole, and an actuator for the movable orifice element responsive to temperature changes in the chamber comprising a bimetallic strip exterior of said hole, an anchor at one end of said strip to one of said orifice elements, means forming a slot in one of said orifice elements adjacent the other end of said strip and means on the other end of said strip extending through said slot into engagement with the other orifice element.

3. An orifice fitting comprising an upstream casing, a downstream casing, faces respectively on said casings having recesses therein forming when assembled an orifice chamber, an orifice plate comprising a stationary orifice element having opposite parallel surfaces adapted to be secured between the faces of said casings and securing means extending from one casing to the other past said orifice plate to hold said casings and plate in assembled position, said orifice plate having a hole therethrough in substantial alignment with the center line of said casings, a recess on the upstream side of said plate extending partway around said hole, a movable orifice element pivotally mounted in said recess, an arcuate edge on said movable orifice element tangent in all positions of adjustment to the perimeter of the hole, means for setting the movable orifice element for a predetermined orifice size comprising means forming a slot in said plate and a fastening member on the movable orifice element extending through said slot and having a manually releasable engagement with the plate.

4. An orifice fitting comprising an upstream casing, a downstream casing, faces respectively on said casings having recesses therein forming when assembled an orifice chamber, an orifice plate comprising a stationary orifice element having opposite parallel surfaces adapted to be secured between the faces of said casings and securing means extending from one casing to the other past said orifice plate to hold said casings and plate in assembled position, said orifice plate having a hole therethrough in substantial alignment with the center line of said casings, a recess on the upstream side of said plate extending partway around and open to said hole, a movable orifice element pivotally mounted in said plate recess, an arcuate edge on said movable orifice element tangent in all positions of adjustment to the perimeter of the hole, and an actuator for the movable orifice element responsive to temperature changes in the chamber comprising an arcuate bimetallic strip extending around the exterior of said hole, an anchor at one end of said strip to said orifice plate, means forming a slot in said plate adjacent the other end of said strip and a connection on the other end of said strip extending through said slot into engagement with said movable orifice element.

5. An orifice fitting adapted to extend transversely in a fluid flow line and comprising a plate having an upstream side, an opposite downstream side and an arcuate orifice extending through the plate, said upstream side having a recess extending circumferentially of and contiguous said orifice, a flat arcuate orifice element in said recess extending circumferentially of said orifice and having opposite end edges and an inside arcuate edge adjacent the perimeter of the orifice, said element being pivotal on an axis adjacent one of said end edges for limited swinging movement of the element in said recess altering the size of the opening through the plate as defined in part by said inner edge of said element and in part by a portion of the perimeter of said orifice opposite said inner edge, said element being of an extent taken circumferentially of said orifice of at least 180° from said pivotal axis to that of said end edges which is remote from said axis whereby said inner edge is substantially tangent to the perimeter of said orifice in all positions of said element, and means interconnecting the orifice element and the plate for supporting said element flat in said recess.

References Cited in the file of this patent

UNITED STATES PATENTS

| | | |
|---|---|---|
| 2,402,585 | Allison | June 25, 1946 |
| 2,952,337 | Coffin | Sept. 13, 1960 |
| 3,025,882 | Weakly | Mar. 20, 1962 |